United States Patent [19]

Chao et al.

[11] Patent Number: 5,481,694

[45] Date of Patent: Jan. 2, 1996

[54] HIGH PERFORMANCE MULTIPLE-UNIT ELECTRONIC DATA STORAGE SYSTEM WITH CHECKPOINT LOGS FOR RAPID FAILURE RECOVERY

[75] Inventors: Chia-Chiang Chao, Sunnyvale; Robert M. English, Palo Alto; David M. Jacobson, Santa Clara; Alexander A. Stepanov; Andrew J. Wilkes, both of Palo Alto, all of Calif.

[73] Assignee: Hewlett-Packard Company, Palo Alto, Calif.

[21] Appl. No.: 873,928

[22] Filed: Apr. 24, 1992

Related U.S. Application Data

[63] Continuation-in-part of Ser. No. 767,109, Sep. 26, 1991, Pat. No. 5,345,575.

[51] Int. Cl.⁶ ..................................................... G06F 13/00
[52] U.S. Cl. ........................................... 395/439; 395/404
[58] Field of Search ...................................... 395/400, 425

[56] References Cited

U.S. PATENT DOCUMENTS 5,124,987  6/1992  Milligan et al. ..................... 371/10.1

FOREIGN PATENT DOCUMENTS

0440413A2  8/1991  European Pat. Off. .
WO91/20025  12/1991  WIPO .

*Primary Examiner*—David L. Robertson

[57] ABSTRACT

An electronic data storage system including a memory, a plurality of magnetic disk units, and a controller. The memory contains an index cross-referencing logical address with physical addresses, an obsolete list and a free list. In response to a "write" command, the controller selects a physical address according to which segment can be used the most quickly, appends a tag to the data to be written, and writes the data to the selected segment. Appropriate entries are made in the index and the free list. The system recovers from memory loss by using a checkpoint log and a set of checkpoint segments on the disk that together contain backups of the index and other critical information needed to restore the system. Group indices are used for roll-back groups; operations on data in a group are invisible outside the group until after a "commit" command is issued.

15 Claims, 10 Drawing Sheets

| | |
|---|---|
| OPERATIONS LOG | COMMIT<br>COMMIT<br>DELETE<br>DELETE |
| CHECKPOINT LOG | INDEX ENTRY<br>INDEX ENTRY<br>INDEX DELETION<br>INDEX DELETION |
| FREE LIST | PHYSICAL ADDRESS<br>PHYSICAL ADDRESS |
| OBSOLETE LIST | PHYSICAL ADDRESS<br>PHYSICAL ADDRESS |
| REFERENCE LIST | PHYSICAL ADDRESS...REFERENCE COUNT<br>PHYSICAL ADDRESS...REFERENCE COUNT |
| GROUP INDEX 2 | LOGICAL ADDRESS...PHYSICAL ADDRESS...STATUS<br>LOGICAL ADDRESS...PHYSICAL ADDRESS...STATUS |
| GROUP INDEX 1 | LOGICAL ADDRESS...PHYSICAL ADDRESS...STATUS<br>LOGICAL ADDRESS...PHYSICAL ADDRESS...STATUS |
| GLOBAL INDEX | LOGICAL ADDRESS...PHYSICAL ADDRESS<br>LOGICAL ADDRESS...PHYSICAL ADDRESS |

*FIG. 4*

HIGH PERFORMANCE MULTIPLE-UNIT ELECTRONIC DATA STORAGE SYSTEM WITH CHECKPOINT LOGS FOR RAPID FAILURE RECOVERY

CROSS-REFERENCE TO RELATED APPLICATIONS

This patent application is a continuation-in-part of patent application Ser. No. 07/767,109, filed Sep. 26, 1991, now U.S. Pat. No. 5,345,575 issued Sep. 6, 1994, the contents of which are incorporated herein by this reference.

BACKGROUND OF THE INVENTION

The present invention relates generally to electronic computers and more particularly to systems for storing data in non-volatile storage such as magnetic media.

The task of organizing data on a storage medium such as a rotating magnetic disk has traditionally been performed by the file system of a host processor. Such a file system, which may be part of an operating system, a database system, or some other application, has more information on the global system state than does a local disk controller. The ability to use such global information offers a theoretical advantage, and for this reason it has generally been believed that the host processor can do a better job of organizing the data on the disk than can the local disk controller.

In practice, detailed knowledge of disk performance characteristics, disk geometry and the like are readily available at the disk-controller level but are not conveniently utilized by the host processor. A system that could take advantage of this type of detailed knowledge would have the potential to provide greatly improved disk performance. Such a system has been proposed in the context of a single spindle disk drive system. This system relies on the disk controller rather than the host processor to organize data on the disk, but its ability to use the detailed knowledge of the disks results in significantly improved performance.

In the proposed system, a small number of segments on the disk, typically not more than about five percent, are reserved as free segments. These free segments are scattered about the surface of the disk. When a block of data is to be written on the disk, the local disk controller selects the nearest free segment to the current head position and writes the data there. This results in very fast writes because there is usually a free segment within a fraction of a revolution of the disk. Writes can be performed in the order in which received without any performance penalty. Also, an update never overwrites the old copy of the data.

An "indirection table" is kept in memory to keep track of where on the disk each block of data is written. A "free map" is used to find free segments efficiently. To allow recovery of the indirection table in case of memory loss, for example due to a power failure, reverse indices are written in the segments on the disk. The reverse indices make it possible to rebuild the indirection table if the one in memory is lost, although this is time-consuming because the entire disk must be read in order to recover all the information. This system significantly improves the performance of disk memory systems.

Despite the improved performance offered by the above-described system, there remains a need for a way to improve the performance of a disk system having a plurality of spindles and to reduce the time required for recovery if system information such as the indirection table is lost from volatile memory.

SUMMARY OF THE INVENTION

The present invention provides an electronic data storage system in which the time required to write data in a multiple-spindle disk drive system is greatly reduced and the recovery speed is greatly increased when compared to other disk drive systems. The present invention also facilitates provisional storage operations that are not visible outside a defined "rollback group".

Briefly, a host computer provides the disk storage system with a logical address and a block of data for storage at that logical address. The disk controller selects a disk unit and a segment for the data, according to an algorithm such as which segment can be accessed the fastest, and writes the data there. The controller maintains an index in memory (such as RAM) to correlate logical addresses with physical addresses.

Preferably the index is maintained partly as a global index and partly as one or more dynamically-created rollback group indices. The disk system controller maintains these indices along with a free list indicating which segments are available for storage of data and an obsolete list indicating which storage segments contain obsolete data but are not yet ready to be released to the free list. These indices and lists are maintained in volatile memory but are readily recoverable if there is a failure of the memory. Recovery of these lists and indices can be done without having to read the entire disk. A small number of the segments on the disk are reserved as "checkpoint segments"; these segments contain enough information to reconstruct the indices without having to read the entire disk.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. 4 is a memory map showing the contents of the memory of the system of FIG. 1.

DESCRIPTION OF THE PREFERRED EMBODIMENT

Figure 1:
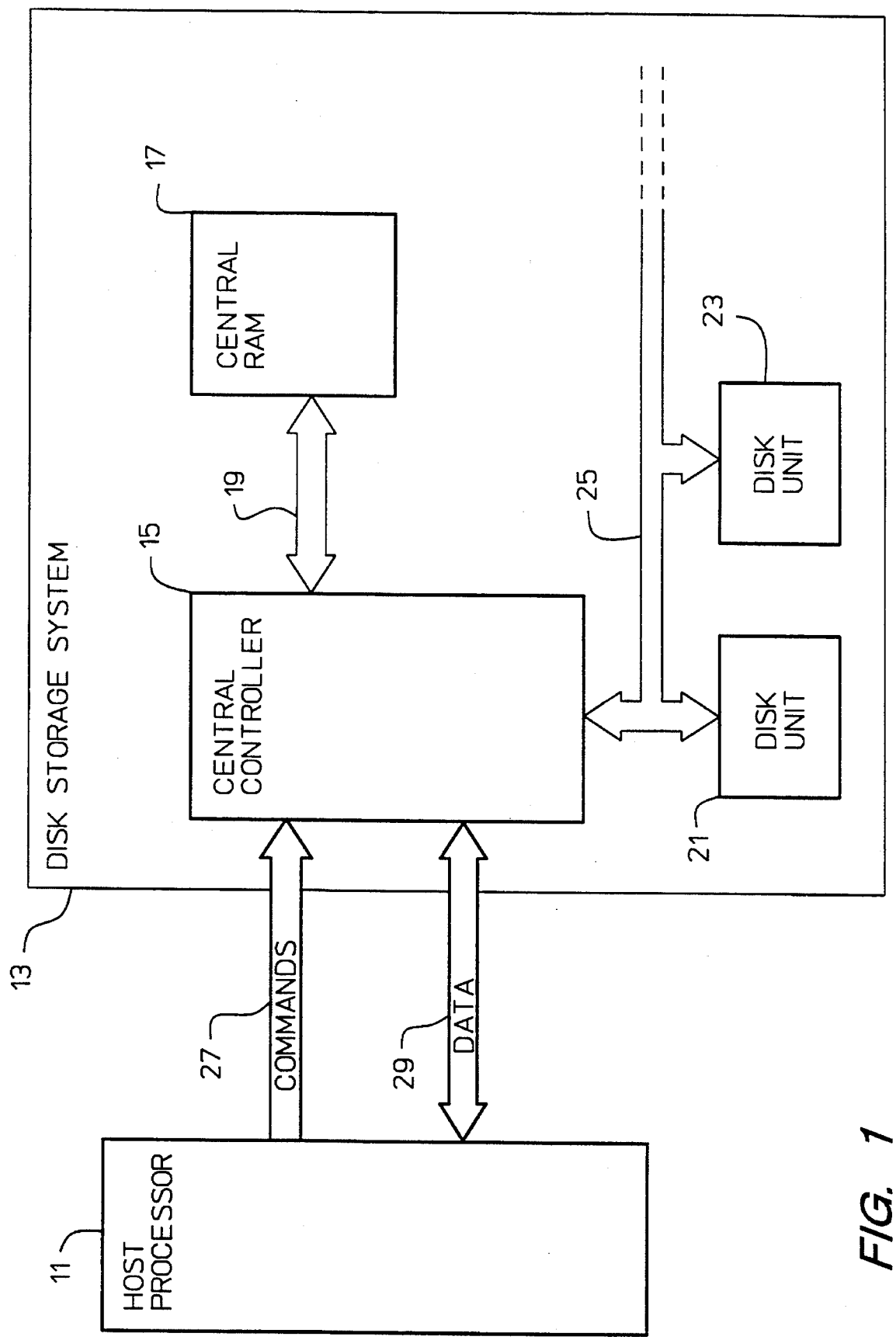
FIG. 1 is a block diagram of a preferred embodiment of a disk storage system according to the invention.

As shown in FIG. 1, in one embodiment an electronic data storage system according to the invention includes a central controller 15, a memory 17 and a plurality of storage units 21 and 23. The controller 15 communicates with the memory 17 through a communication channel 19 and with the storage units 21 and through a communication channel 25. The controller 15 receives commands from a host processor 11 through a communication channel 27, and data is exchanged between the controller 15 and the host processor 11 through a communication channel 29.

Figure 2:
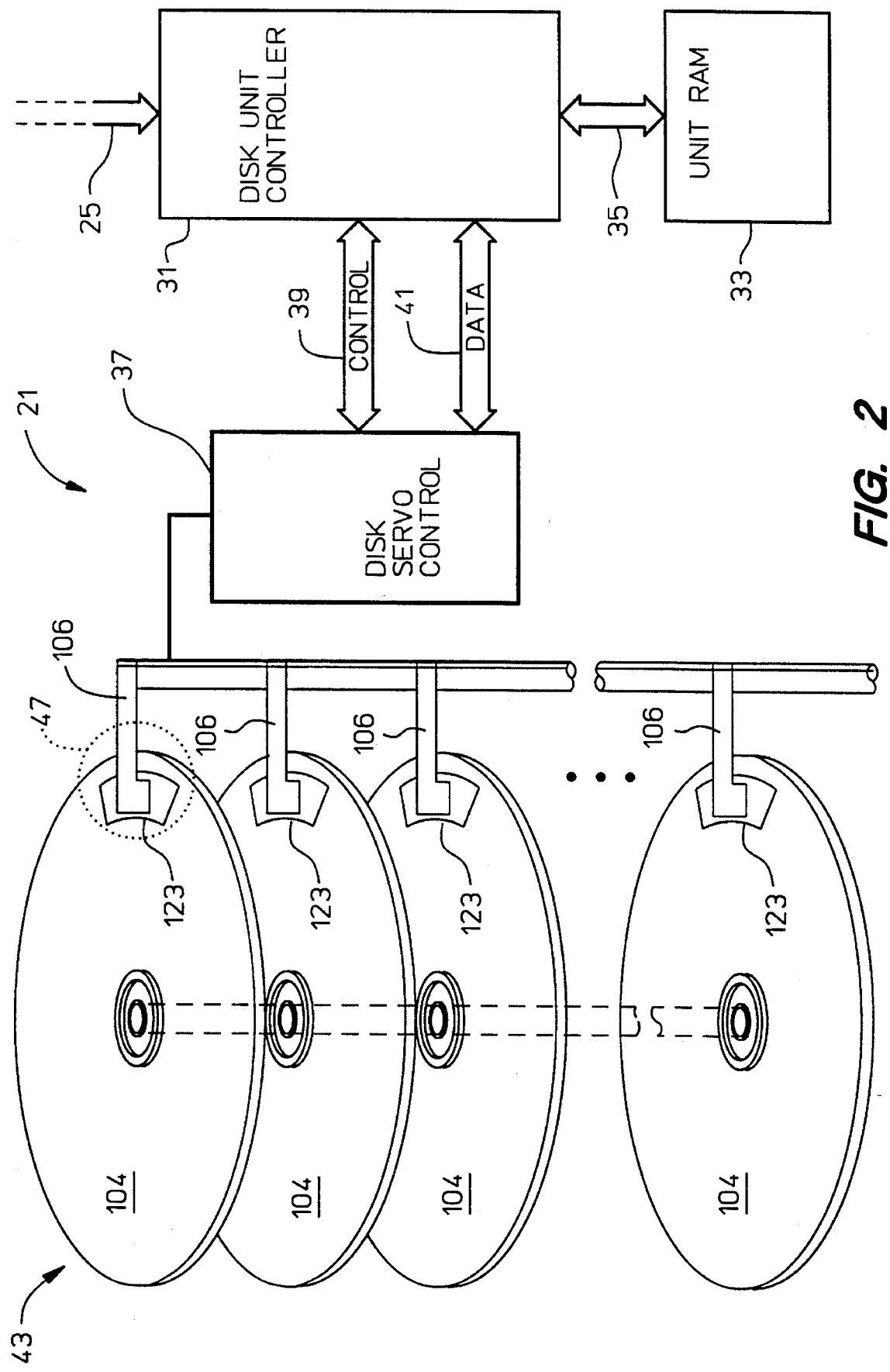
FIG. 2 is a block diagram of a disk unit of the kind shown as a block in FIG. 1.
Figure 3:
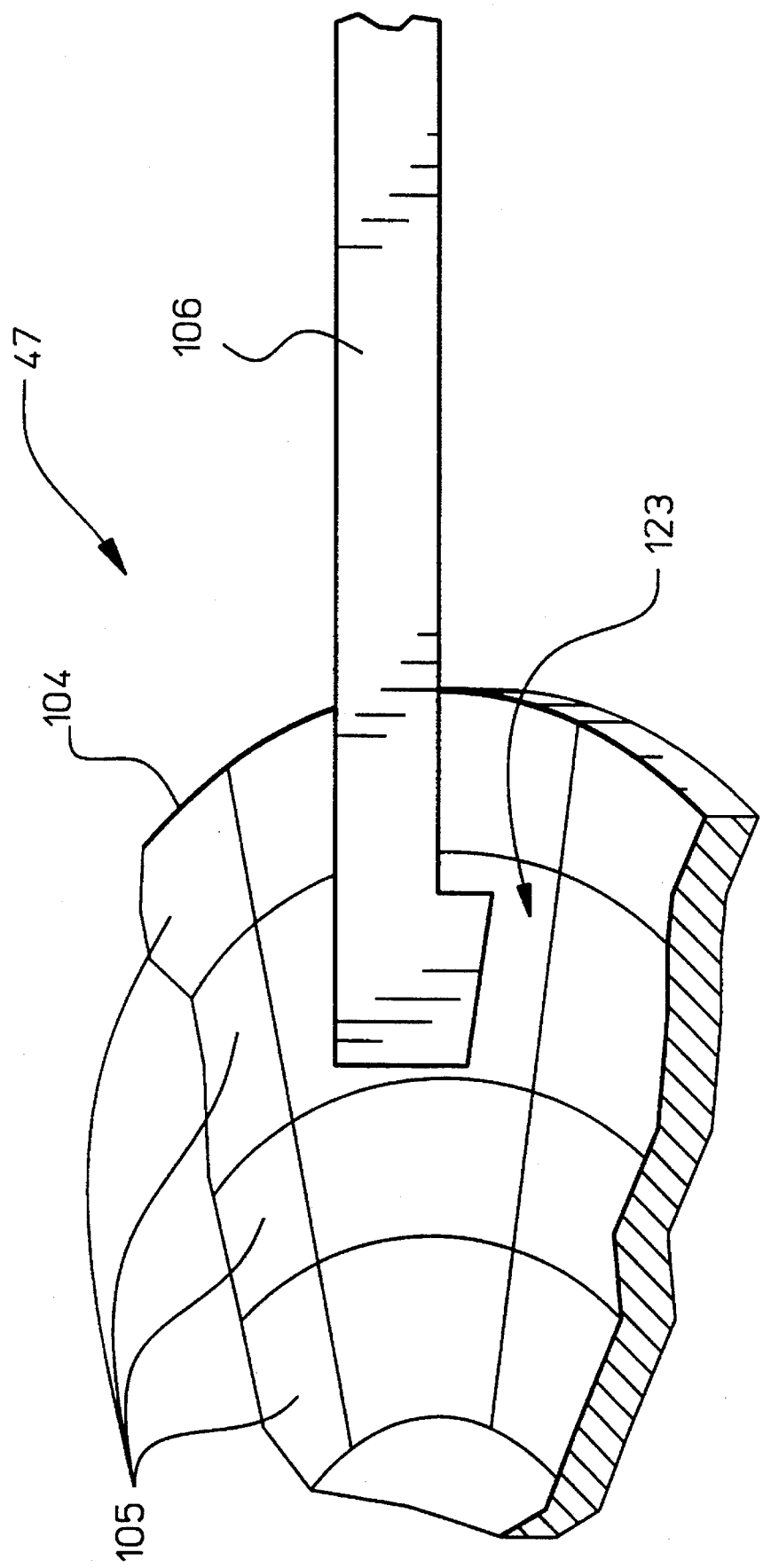
FIG. 3 is a close-up view of a portion of the disk unit shown in FIG. 2.

The storage unit 21 is illustrated in greater detail in FIG. 2. A unit controller 31 is in communication with the central controller 15 through the channel 25. A unit memory 33 is in communication with the controller 31 through a communication channel 35. The controller 31 is in communication with a disk servo control circuit 37 through a control channel 39 and a data channel 41. The servo control circuit 37 controls electromechanical operation of a plurality of magnetic disks 104 and a plurality of read-write heads which are carded by actuator arms 106 and which at any given time are positioned over storage areas 123 on the various disks 104. A close-up view of a region 47 of one of the disks 104 is shown in FIG. 3, including a plurality of other nearby storage areas 105 on the disk 104.

A plurality of control signals and information are managed by the central controller 15 and stored in the central memory 17. A global index includes entries each of which gives a logical address and a corresponding physical address (unit and segment identifiers) for data blocks that are stored on the disks.

Some blocks of data are assigned to rollback groups. A group index is created dynamically for each designated rollback group. Each index includes entries each of which gives a logical address and a corresponding physical address for a data block that is stored on the disks and that is assigned to the particular rollback group which corresponds to that index. Occasionally a block of data that is a member of one group may be referenced, not only by an entry in the index which corresponds with the group to which the block belongs, but also by an entry in the global index or in one or more other group indices. Each entry in a group index carries a status indicator that designates its status as being either "write", "no-write " or "delete".

A "reference list " is maintained in memory by the controller. The reference list gives a reference count for each physical address that appears in any of the indices. The reference count for a given physical address indicates the number of times that such physical address is listed in all the indices.

An "obsolete list " is also maintained by the controller. This list includes physical addresses for segments that contain obsolete data but that have not yet been released for the entry of new data.

An "operations log " is maintained in memory and includes a record of all create group, copy, delete, commit, abort and barrier commands that have been issued subsequent to the most recent of any sync command and checkpoint operation. A "checkpoint log " lists all entries in and deletions from all the indices subsequent to the most recent of any sync command and checkpoint operation.

The portion of memory that contains the global and group indices is divided into a plurality of k "checkpoint sections", where k is an integer. Among the various disk storage units 21 and 23, a total of k+1 "checkpoint segments " are reserved. These may be all in one storage unit such as the unit 21 or they may be distributed among a plurality of the units as is convenient. These checkpoint sections in memory, checkpoint segments on disk, and operations log are used for recovery if there is a memory loss, as will be described in more detail presently.

The unit memory of each storage unit includes a free map which gives a list of the available storage segments in that unit.

These physical and memory elements, which are described and illustrated as discrete elements, may be combined in an actual physical embodiment. For example, all of the memories may be realized in a single bank of RAM memory. The free maps may be combined into a single free map that lists all free segments in all of the storage units. FIG. 4 is an example of a memory map that depicts how the various lists, logs and indices might be stored in a single bank of RAM that would serve an entire system; it will be apparent that these lists and indices could be arranged as desired if the memory elements were distributed among more than one unit of the system.

Some or all of the various controller functions may be performed by one microprocessor or other control device, or the controller functions may be distributed among a central controller and a plurality of disk unit controllers as shown.

Various commands are issued by the host processor 11. The host processor may be a general-purpose computer, a network server, or some other device that requires a data storage system.

The storage units contemplated by the invention are magnetic disk storage units as described and illustrated. However, it will be apparent that the principles of the invention are equally applicable to other types of storage devices, such as optical media, bubble memories, and so on.

Commands Issued by the Host Processor

Figure 5:
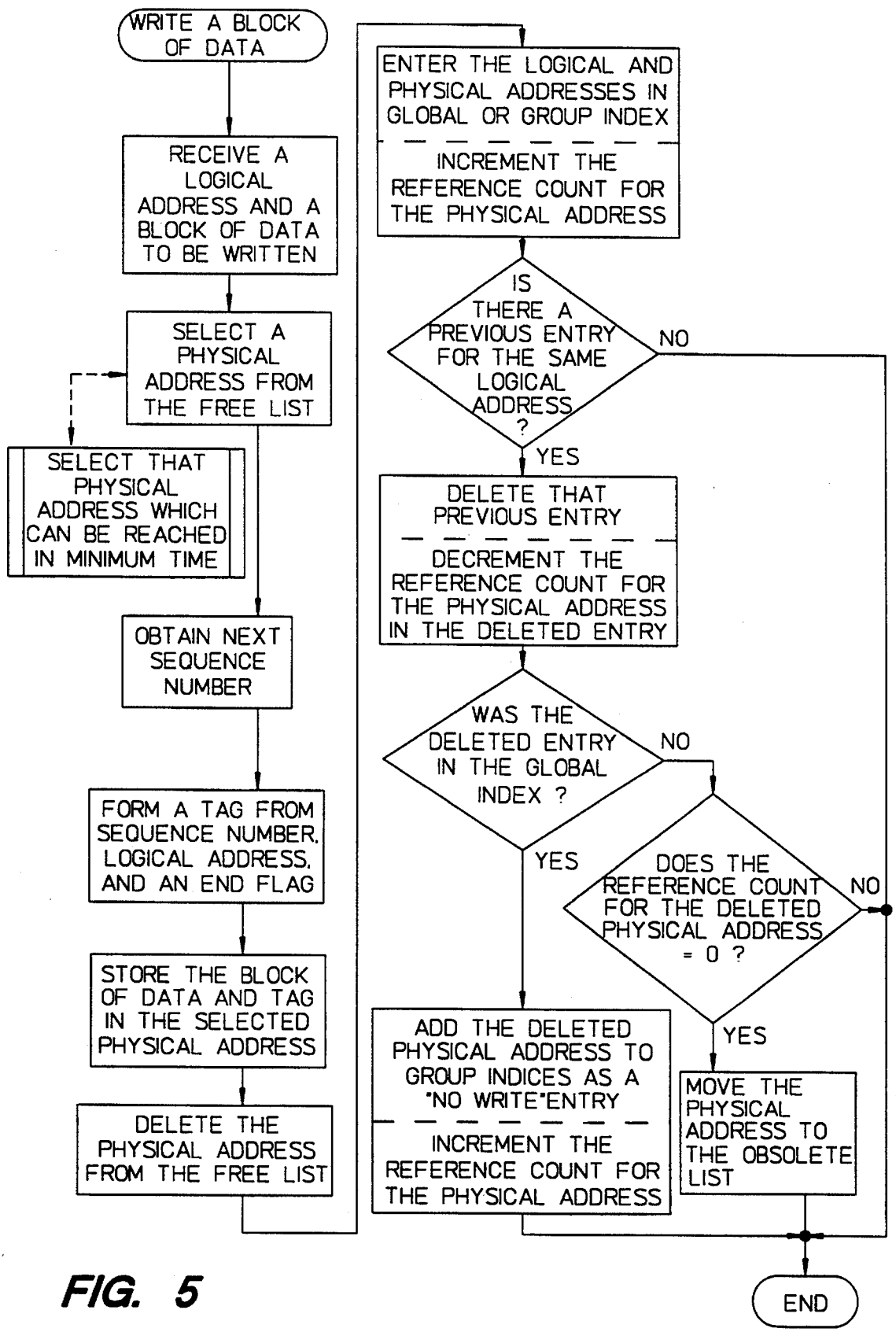
FIG. 5 is a flow chart illustrating the response of the system of FIG. 1 to a "write" command for writing a block of data to disk.
Figure 6:
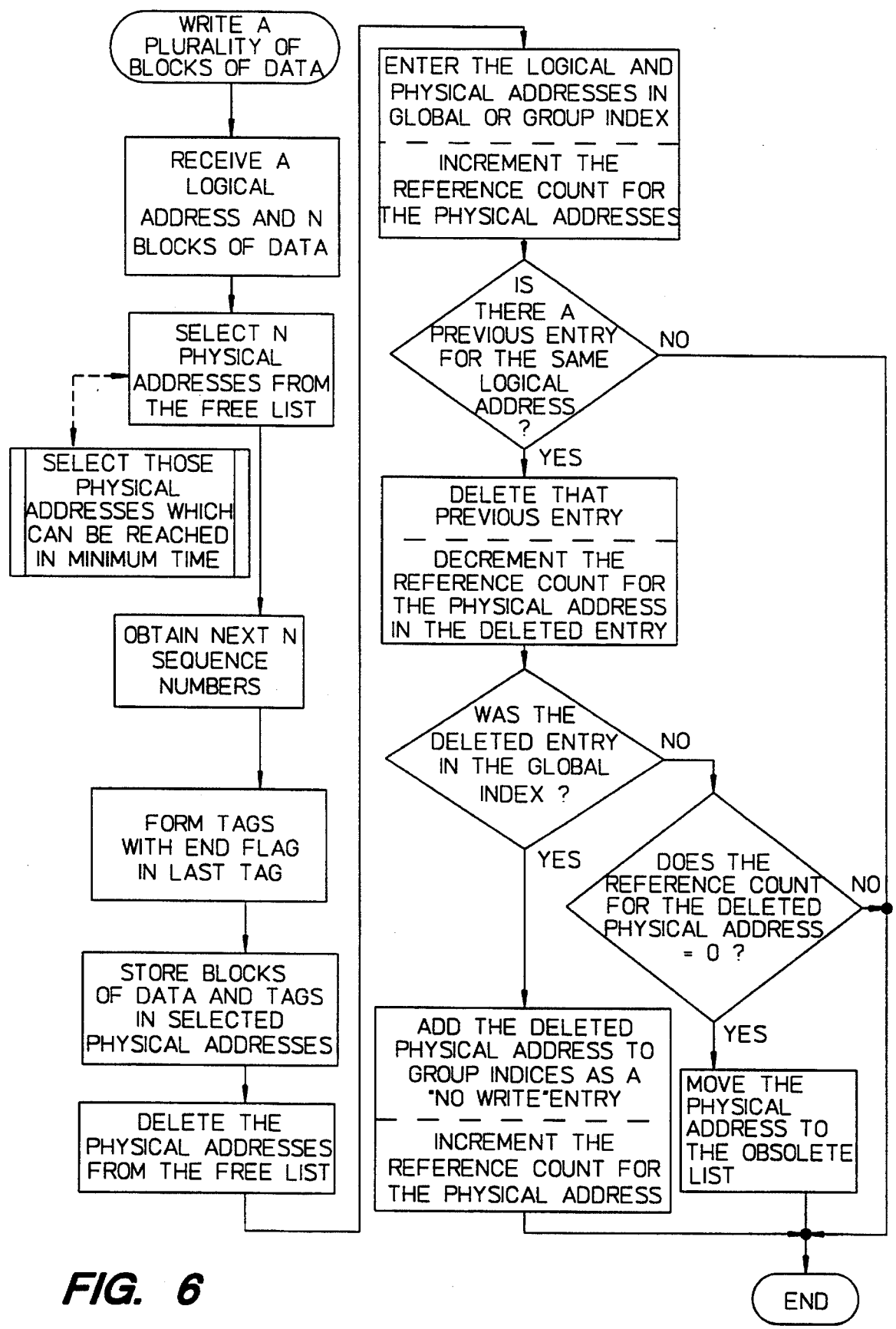
FIG. 6 is a flow chart illustrating the response of the system of FIG. 1 to a "write" command for writing a plurality of blocks of dam to disk.

The storage system receives various commands from the host processor and performs various actions in response to those commands, as will now be described in more detail.
"Write " Command This command includes a logical address, one block of data to be written by itself or a plurality of blocks to be written as a multi-block write, and optionally a group identifier. The steps of this command are illustrated in flow-chart form in FIG. 5 for a write command for a single block of data and in FIG. 6 for a write command for a plurality of blocks to be written as a multi-block write.

In response to a write command, the central disk controller 15 performs a series of tasks for each block to be written. First the controller selects a storage unit such as the disk unit 21 or the disk unit 23 according to a criterion such as which of the units has the most free space. A better criterion will usually be an algorithm for distributing writes equally among all the storage units.

Next the controller selects a segment from the free list for the selected storage unit. One way of making this selection is to select that segment which can be reached in minimum time. In the context of a disk drive unit, this time includes seek time (the time required to move the magnetic recording head carried by the actuator arm 106 into position), rotational delay time (the time required for the desired segment 123 to rotate into position), and the time to actually transfer the data. By monitoring the positions of the heads and the angular positions of the disks, one can select from among the available segments a segment that can be accessed in minimum time relative to the access time of any other available segment. The selection process, which is dynamic because the heads and disks are in continuous or nearly-continuous motion, may be done by the central disk controller 15 or may be delegated to the disk unit controller 31 as desired.

Then the controller appends a tag to the block. The tag includes the logical address and the next consecutive sequence number from a sequential set of such numbers. The tag also includes an end flag unless the block is a beginning or intermediate block in a multi-block write. If the block is a member of a rollback group, the group identifier is also included in the tag.

Next the controller records the block and its tag at the selected physical address (segment and storage unit); deletes the segment from the free map; enters the logical and physical addresses in the group index with a write status indicator, or if there is no group identifier then in the global index; and increments the reference count for the physical address.

If the same logical address appears together with a previous physical address in a previous entry, the controller deletes the previous entry and decrement the reference count for the previous physical address. In addition, if the previous entry was in the global index, the controller inserts the previous entry into any of the group indices which do not already contain the address as "no-write" entries, and increments the reference count for the previous physical address once for each index into which the previous entry is inserted. If the count decrements to zero, which indicates that the physical address is not on any index, the physical address is moved to the obsolete list.

Finally, the controller enters all insertions and deletions in the checkpoint log.

"Create Rollback Group " Command

The "create rollback group " includes a group identifier for the new rollback group. In response to this command, the central disk controller 15 creates a group index for the new rollback group and assigns the next sequence number and enters the command in the operations log.

"Read " Command

Figure 7:
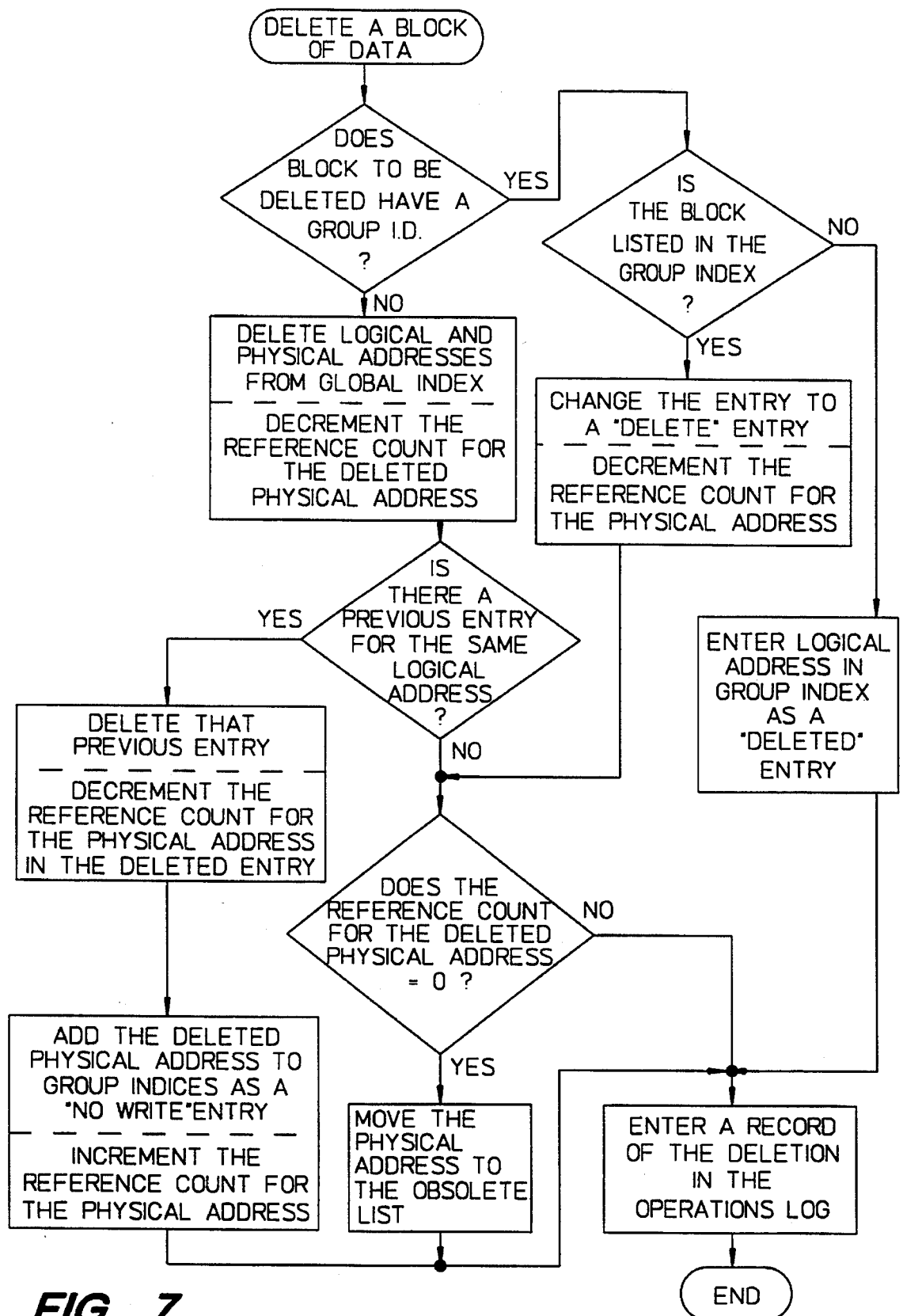
FIG. 7 is a flow chart illustrating the response of the system of FIG. 1 to a "delete" command.

The "read " command includes a logical address and optionally a group identifier. In response to this command, the central controller 15 searches the group index to find the physical address of the data block to be read. If not found, or if there is no group identifier, the controller searches the global index to find the physical address. The physical address is used to retrieve the data block from disk, and then the data block is sent to the host processor. "Delete " Command The "delete " command includes a logical address and optionally a group identifier. The steps of this command are illustrated in flow-chart form in FIG. 7. In response to this command, the controller 15 does the following:

If them is a group identifier and the block is already listed in the group index, the controller changes the entry to a delete entry and decrement the reference count for the physical address. If there is a group identifier and the block is not listed in the group index, the controller enters the logical address of the block in the group index as a delete entry.

If them is no group identifier, the controller deletes the entry from the global index and decrements the reference count for the physical address. In addition, if the same logical address appears together with a previous physical address in a previous entry in the global index, the controller deletes the previous entry, decrements the reference count for the previous physical address, inserts the previous entry in all the other group indices which do not already contain that address as "no-write " entries, and increments the reference count for the previous physical address once for each index into which the previous entry is inserted. If the reference count for a physical address goes to zero, that address is entered in the obsolete list.

Then the controller assigns the next sequence number, enters the command in the operations log, and enters all insertions and deletions in the checkpoint log.

"Barrier " Command

The "barrier " command is issued by the host any time it wants to preserve a certain state of the various data items as a valid state to which it can return. It may identify a rollback group if its effect is to be limited to one group. In response to this command, the controller assigns the next sequence number and enters the command in the operations log.

"Abort " Command

The "abort " command identifies a rollback group to be aborted. In response, the controller decrements the reference count for the physical address of each write entry and each no-write entry in the group index, deletes the group index, assigns the next sequence number and enter the command in the operations log, and enters each deletion in the checkpoint log.

"Commit " Command

Figure 8:
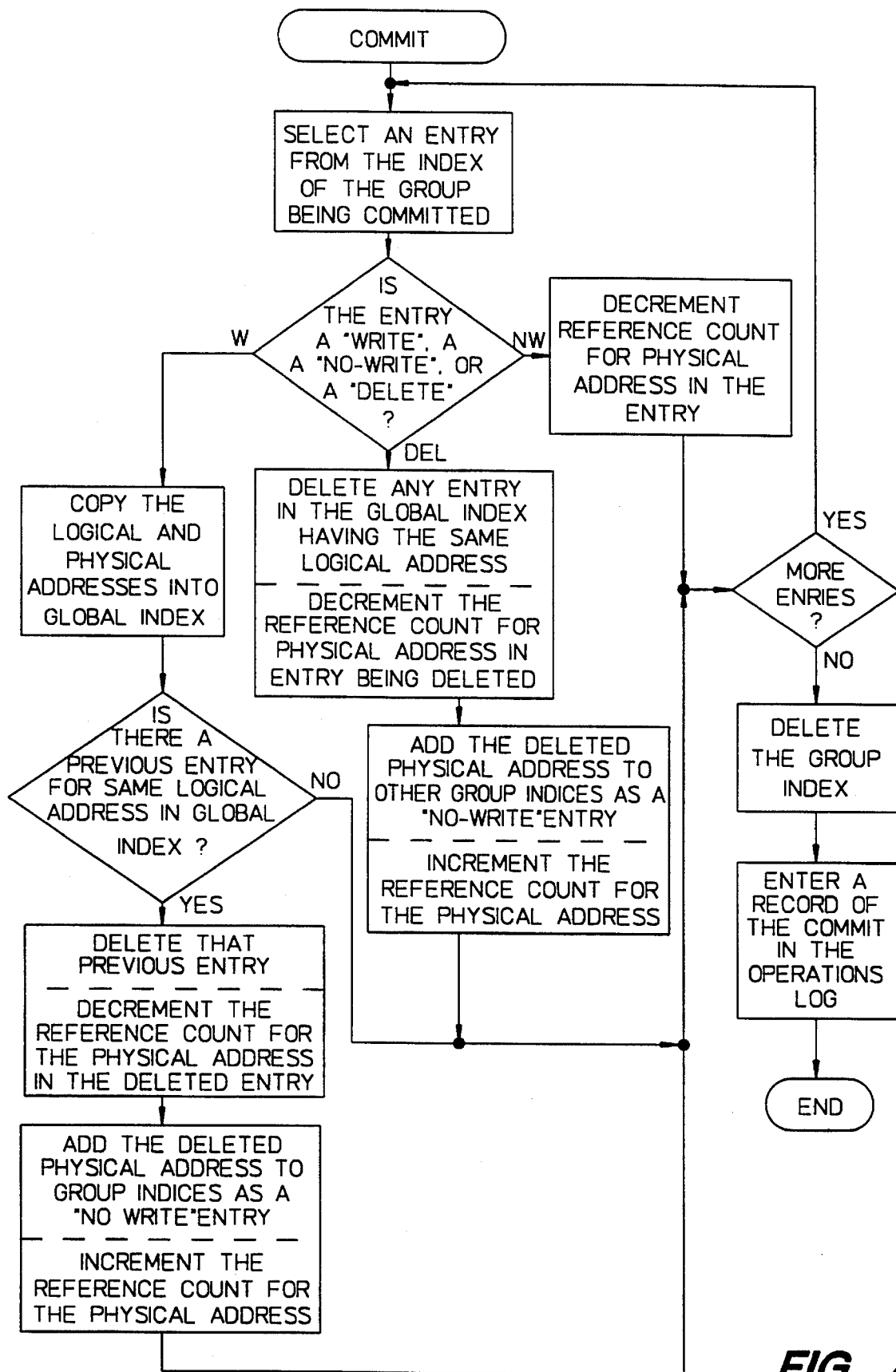
FIG. 8 is a flow chart illustrating the response of the system of FIG. 1 to a "commit" command.

The "commit " command identifies a rollback group to be committed. The steps of this command are illustrated in flow-chart form in FIG. 8. In response to this command, the controller does the following:

If the entry is a "write " entry, the controller moves the entry from the group index to the global index and, if the same logical address appears together with a previous physical address in a previous entry in the global index, deletes the previous entry, decrements the reference count for the previous physical address, inserts the previous entry in all the other group indices which do not already contain that address as no-write entries, and increments the reference count for the previous physical address once for each index into which the previous entry is inserted.

If the entry is a no-write entry, the controller decrements the reference count for the physical address. If the entry is a delete entry, the controller deletes any entry having the same logical address from the global index, decrements the reference count for the physical address of the deleted entry, inserts the previous entry in all the other group indices which do not already contain that address as no-write entries, and increments the reference count for the previous physical address once for each index into which the previous entry is inserted.

Then the controller deletes the group index, assigns the next sequence number, enters the command in the operations log, and enters all insertions and deletions in the checkpoint log.

As with the other commands, if the reference count of a physical address goes to zero, that address is thereupon listed in the obsolete list.

"Copy " Command

This command includes a logical address of a block to be copied and a new logical address into which to copy the block. Group identifiers are optionally provided for one or both of these addresses.

In response to this command, the controller looks up the physical address of the block to be copied. Then it enters the new logical address as a write entry in the identified group index, or if none then in the global index, together with the physical address of the block being copied, and increments the reference count for the physical address.

If the same logical address appears together with a previous physical address in a previous entry, the controller deletes the previous entry and decrements the reference count for the previous physical address, and, if the previous entry was in the global index, inserts the previous entry into all the group indices which do not already contain the address as no-write entries, and increments the reference count for the previous physical address once for each index into which the previous entry is inserted.

Then the controller assigns the next sequence number and enter the command in the operations log and enters all insertions and deletions in the checkpoint log.

"Sync" Command

Figure 9:
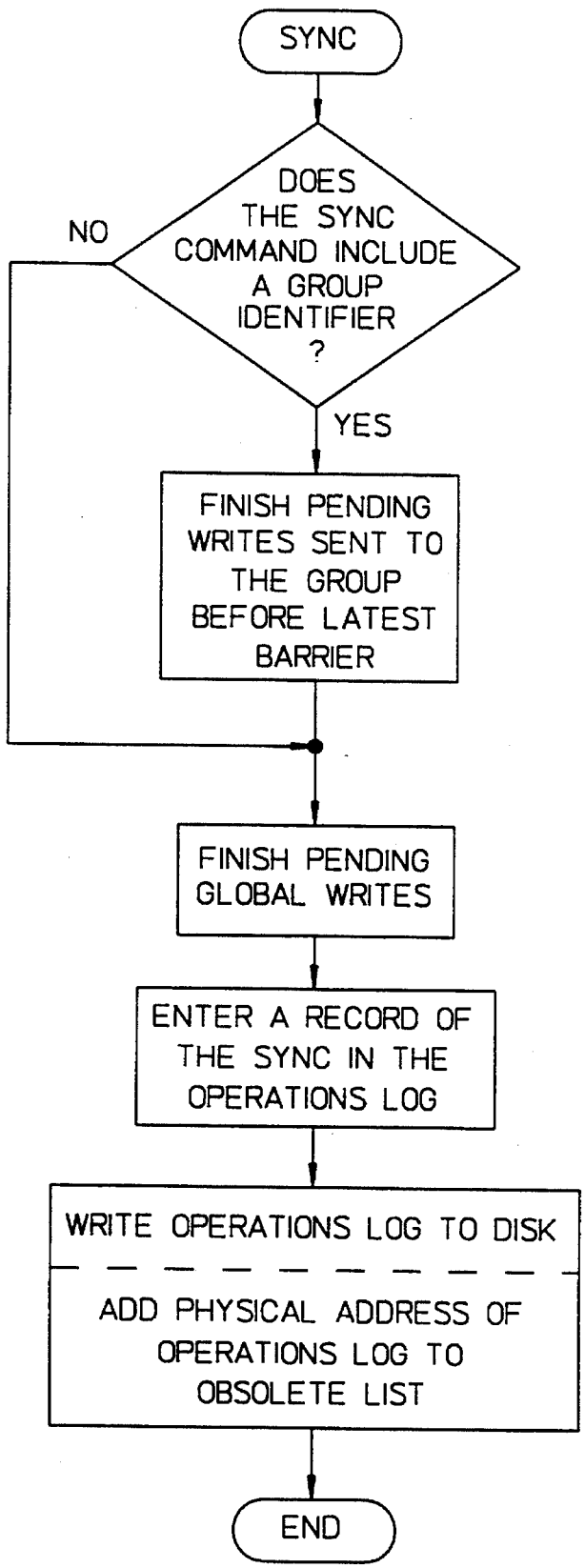
FIG. 9 is a flow chart illustrating the response of the system of FIG. 1 to a "sync" command.

This command is issued by the host process any time it wants to ensure that commands which have previously been sent to the controller have been completed. The command optionally includes a group identifier that limits its scope to the identified group. The steps of this command are illustrated in flow-chart form in FIG. 9.

In response to a sync command, if there is a group identifier the controller finishes any pending write commands that were issued before the latest barrier sent to the group. Any pending global write commands are finished, including ones that were placed there before a "commit" command. The operations log and the next sequence number are written to an available segment, and the physical address to which the log was written is added to the obsolete list.

The operations log is only needed to recover a record of any operations subsequent to the most recent checkpoint operation. Therefore, its physical address can immediately be placed in the obsolete list.

Free List and Checkpoint Operations

Certain operations are performed by the central controller without a command from the host processor. These operations will be described next.

"Checkpoint"

Figures 10, 11:
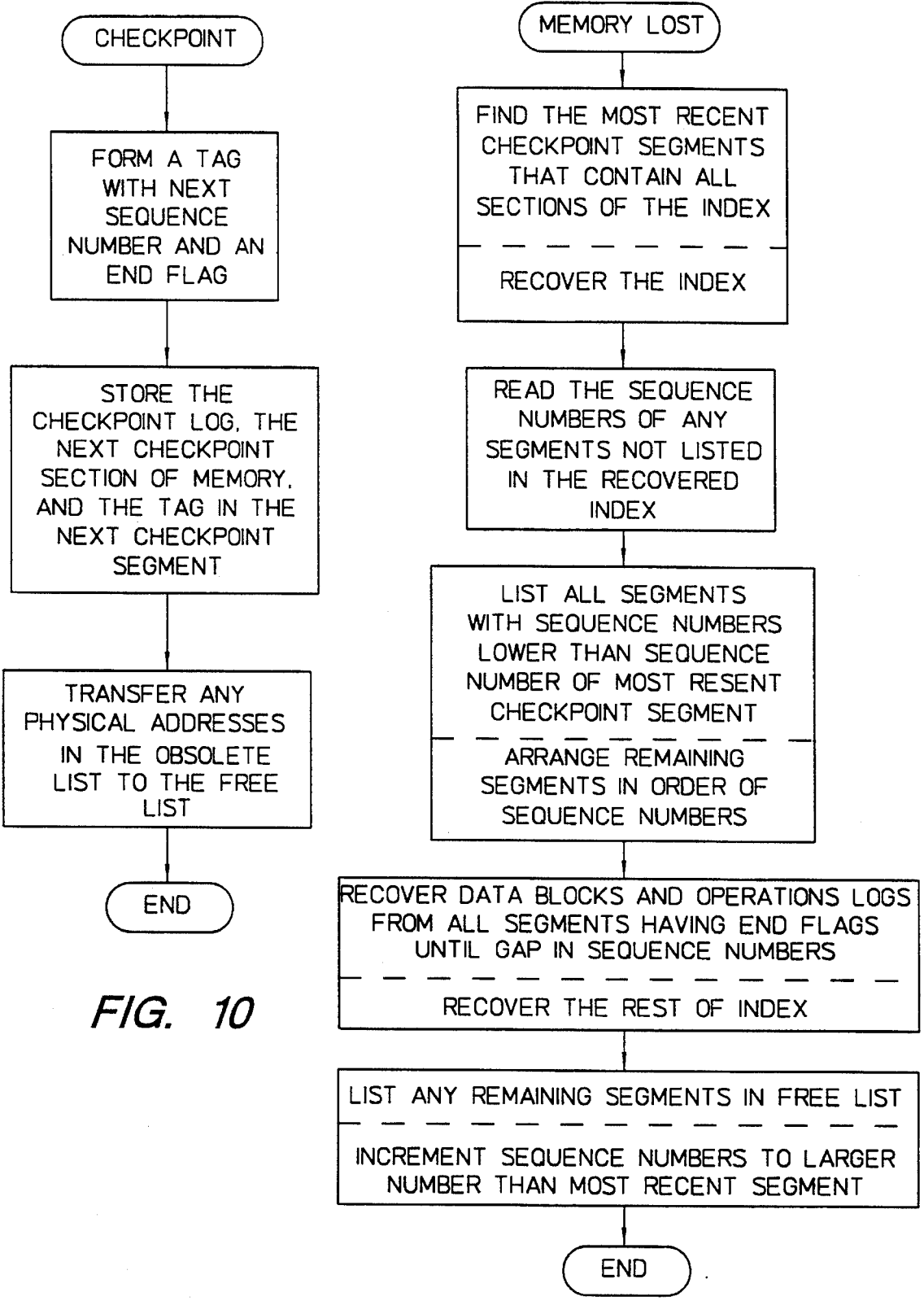
FIG. 10 is a flow chart illustrating the "checkpoint" procedure of the system of FIG. 1.
FIG. 11 is a flow chart illustrating the response of the system of FIG. 1 to a lost memory situation.

Periodically, an image of the checkpoint log and of a sequential one of the checkpoint sections of memory, together with the next sequence number, are written to a sequential one of the checkpoint segments of the disk. Any physical addresses then in the obsolete list are transferred to the free maps. This procedure is illustrated in flow-chart form in FIG. 10.

"Reference Count"

If the reference count for a physical address goes to zero, that physical address is entered in the obsolete list. This is discussed above in connection with some of the specific commands. In general, entry of the physical address in the obsolete list would only occur at the end of the command during which the count goes to zero. This prevents an entry from being made in the obsolete list if the count goes to zero and then is incremented back to a positive value during one command.

"Operations Log"

If the operations log reaches a predetermined number of entries or if a sync or checkpoint command is issued, the controller writes the operations log together with the next sequence number to an available segment, adds the physical address to which the log was written to the obsolete list, and clears the operations log in memory.

"Recovery"

If there is a power failure or some other event that wipes out the memory, and perhaps also interrupts a write in progress, the controller swiftly recovers the contents of the memory. The procedure is depicted in flow-chart form in FIG. 11.

In the first step of the recovery procedure, the controller reads the k+1 checkpoint segments to get the k ones that are both most recent and valid. The information recovered from these segments is used in order, starting with the oldest, to reconstruct the global and group indices up through the most recent checkpoint operation.

Then the controller reads all segments not listed in the reconstructed Indices and lists all the segments having sequence numbers older than the most recent checkpoint segment in the free maps. Then it arranges the remaining segments in order of increasing sequence numbers, recovers all data blocks and operations logs from the oldest through the most recent having an end flag until there is a gap in sequence numbers, and uses these to finish reconstructing the indices. Next any remaining segments are listed in the Free Maps. Finally, the sequence numbers are incremented to a number greater than that of the segment having the largest one.

It will be apparent that there are various ways to store and encode the information in the indices and lists, and on the disk. For example, a "delete" status of an entry in a group index may be indicated by a flag or by the absence of a physical address or by a special nonexistent physical address code. Similarly, the end of a block may be indicated by a flag or by some other form of encoding. In some circumstances the presence of a sequence number may be a sufficient indicator of the end of a block to confirm that the block has been completely written prior to any failure.

Although a specific embodiment of the invention has been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

We claim:

1. An electronic data storage system comprising a memory; a plurality of storage units each having a plurality of segments for storing blocks of data, each segment identified by a physical address; and a controller in communication with the memory and the storage units, the controller operative:

to maintain in the memory an index containing entries each having a logical address and a corresponding physical address, an obsolete list containing physical addresses of segments that contain obsolete data, and a free list containing physical addresses of segments that are available to receive data for storage, and in response to a write command that provides a preselected logical address and an associated block of data for storage, to (a) select a physical address from the free list according to a predefined criterion, (b) obtain a next sequence number from a set of sequential numbers, (c) append to the block a tag that includes the sequence number, the preselected logical address, and an end flag, (d) store the block and its tag in the segment of the selected physical address, (e) delete the selected physical address from the free list, (f) enter the preselected logical address and the selected physical address in the index, (g) delete any previous index entry that contains a logical address which is the same as the preselected logical address, and (h) list the physical address from any such deleted entry in the obsolete list.

2. A system as in claim 1 wherein the controller is operative, in response to a write command that provides a preselected logical address and a plurality of associated blocks of data for storage, for each such block to (a) select a physical address from the free list according to the predefined criterion, (b) obtain a next sequence number from the set of sequential numbers, (c) append a tag that includes the sequence number of that block, the tag for the first block also including the preselected logical address, the tag for each block after the first including a logical address calculated by incrementing the logical address of the preceding block, and the tag for the last block including an end flag, (d) store the block and its tag in the segment of the physical address that was selected for that block, (e) delete the selected physical address from the free list, (f) enter the logical address of the block and the selected physical address in the index, (g) delete any previous index entry that contains a logical address which is the same as the logical address of the block, and (h) list the physical address from any such deleted entry in the obsolete list.

3. A system as in claim 1 wherein the predefined criterion comprises which available segment can be accessed in a minimum amount of time relative to the time that would be required to access others of the available segments.

4. A system as in claim 1 wherein the controller is operative to (a) maintain in the memory a checkpoint log that includes a record of each entry in, and each deletion from, the index, (b) arrange the various index entries in a plurality of checkpoint sections, (c) reserve a plurality of the segments as checkpoint segments, and periodically (d) store the checkpoint log, an image of a sequential one of the checkpoint sections of the memory, and a tag that includes a next sequence number from the set of sequential numbers and an end flag in a sequential one of the checkpoint segments and transfer any physical addresses then in the obsolete list into the free list.

5. A system as in claim 4 wherein, if the contents of the memory are lost, the controller is operative to recover the index and the free list by:

reading the checkpoint segments to obtain the most recent valid segments that collectively contain all of the checkpoint sections of the memory, the recency of a segment being indicated by its sequence number and the validity of a segment being indicated by the presence of an end flag, starting with the oldest of the obtained checkpoint segments, using the checkpoint sections and checkpoint logs as stored in the checkpoint segments to recover the index up through the most recent checkpoint, and for all non-checkpoint segments not yet listed in the index, reading the sequence numbers of said segments, entering the physical address of each said segment having a sequence number older than that of the most recent checkpoint segment into the free list, arranging the remaining segments in order of increasing sequence numbers until an invalid segment is detected, entering the logical and physical addresses of each of the arranged segments into the index, and entering the physical address of any remaining segments into the free list.

6. A system as in claim 5 wherein the controller detects an invalid non-checkpoint segment by locating a numerical gap between the sequence numbers of the segments and going back through the segments in reverse order of sequence numbers until a segment having an end-of-block tag is located, the segment following the one having the end-of-block tag being the invalid one.

7. A system as in claim 1 wherein the controller is operative:

to maintain the index as a global index and one or more group indices, to create a group index in response to a create-group command, each group index containing entries each having the logical address of a block that belongs to the group, a status indicator, and, if the indicated status is "write" or "no-write", the physical address of the block, to maintain in the memory a reference list that provides a reference count for each physical address that appears either in the global index or in any of the group indices, to include in the tag appended to a block an identifier of any group to which the block belongs, and in response to a write command (a) if the command does not include a group identifier, to enter the preselected logical address and the selected physical address in the global index, (b) if the command includes a group identifier, to enter the preselected logical address, the selected physical address and a "write" status indicator in the group index corresponding with the identified group, (c) to increment the reference count for the selected physical address, (d) to delete any previous entry in the same index that contains the same logical address together with a different physical address, (e) to decrement the reference count for the physical address of the deleted entry, (f) if the deleted entry was in the global index, to copy the logical and physical addresses of the deleted entry and a no-write status indicator into each group index, and (g) to increment the reference count for the physical address of the deleted entry once for each group index into which the entry is copied.

8. A system as in claim 7 wherein the controller is operative in response to a delete command that includes a logical address:

if the delete command contains no group identifier, to delete any global index entry that contains that logical address, to decrement the reference count of the physical address in the deleted entry, and to make corresponding entries in the various group indices;

if the delete command contains a group identifier and the logical address is already entered in the corresponding group index, to delete any physical address from the entry, to change the status indicator to "delete", and to decrement the reference count of the deleted physical address, and if the delete command contains a group identifier and the logical address is not already entered in the corresponding group index, to enter the logical address in the index together with a "delete" status indicator.

9. A system as in claim 8 wherein the controller is operative in response to a commit command that includes a group identifier to delete the corresponding group index and, for each entry in the deleted index:

if the entry has a "no-write" status, to decrement the reference count for the physical address in the entry, if the entry has a "delete" status, to delete any entry in the global index having the same logical address and to decrement the reference count for the physical address in each such deleted entry, and if the entry has a "write" status, (a) to copy the logical and physical address of the entry into the global index, (b) to delete any previous entry in the global index that contains the same logical address together with a different physical address, (c) to decrement the reference count for the physical address in any such deleted entry, (d) to copy the logical and physical addresses of any such deleted entry and a "no-write" status indicator into all other group indices, and (e) to increment the reference count for the physical address of the deleted entry once for each group index into which the entry is copied.

10. A system as in claim 9 wherein the controller is operative to enter any delete and commit commands into an operations log and, in response to a sync command, to store the operations log in an available segment and enter the physical address of that segment into the obsolete list.

11. In an electronic data storage system of the kind having a plurality of storage units each having a plurality of segments for storing blocks of data, each segment identified by a physical address, a data storage and retrieval method comprising:

maintaining an index of logical addresses and corresponding physical addresses;

maintaining an obsolete list containing physical addresses of segments that contain obsolete data;

maintaining a free list containing physical addresses of segments that are available to receive data for storage;

selecting a physical address from the free list for storing a block of data;

storing the block at the selected physical address;

removing the selected physical address from the free list;

entering the selected physical address and a predetermined logical address in the index;

deleting any previous index entry that contains a logical address which is the same as the predetermined logical address; and entering any physical address contained in any such deleted entry in the obsolete list.

12. A method as in claim 11 wherein the step of selecting a physical address from the free list comprises determining which of a plurality of available segments can be accessed in a minimum amount of time relative to the time that would be required to access others of the available segments.

13. A method as in claim 11 and further comprising:

maintaining a checkpoint log that includes a record of each entry in, and each deletion from, the index;

grouping the various index entries in a plurality of checkpoint sections;

storing the checkpoint log and an image of a sequential one of the checkpoint sections in a sequential one of a plurality of predetermined checkpoint segments; and transfering any physical addresses then in the obsolete list into the free list.

14. A method as in claim 13 and further comprising:

appending a next sequential one of a set of sequence numbers to each block of data when such block is stored; and appending a next sequential one of the set of sequence numbers to each checkpoint section when such checkpoint section is stored.

15. A method as in claim 14 and further comprising recovering a lost index and free list by:

reading the checkpoint segments to obtain the most recent valid segments that collectively contain all of the checkpoint sections;

recovering the index up through the most recent checkpoint segment by means of the checkpoint sections and checkpoint logs stored in the checkpoint segments;

reading the sequence numbers of any non-checkpoint segments not in the recovered index;

entering the physical address of each said segment having a sequence number lower than that of the most recent checkpoint segment into the free list;

arranging those segments having sequence numbers higher than that of the most recent checkpoint segment in order of increasing sequence numbers until a gap occurs between the sequence numbers of two such segments;

entering the logical and physical addresses of each of the arranged segments having a sequence number below the gap into the index; and entering the physical address of each of the arranged segments having a sequence number above the gap into the free list.

* * * * *